US008514776B2

(12) United States Patent
Robinson et al.

(10) Patent No.: US 8,514,776 B2
(45) Date of Patent: Aug. 20, 2013

(54) DETERMINING A METRIC REGION IN A WIRELESS NETWORK

(75) Inventors: Joshua P. Robinson, Houston, TX (US); Ram Swaminathan, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 288 days.

(21) Appl. No.: 12/433,717

(22) Filed: Apr. 30, 2009

(65) Prior Publication Data

US 2010/0278057 A1    Nov. 4, 2010

(51) Int. Cl.
*H04W 4/00*    (2009.01)

(52) U.S. Cl.
USPC ........................................................ 370/328

(58) Field of Classification Search
USPC ................................ 370/252, 338, 310.2, 328
See application file for complete search history.

(56) References Cited

U.S. PATENT DOCUMENTS

| | | | | |
|---|---|---|---|---|
| 6,115,580 | A * | 9/2000 | Chuprun et al. | 455/1 |
| 6,708,036 | B2 * | 3/2004 | Proctor et al. | 455/446 |
| 6,735,178 | B1 * | 5/2004 | Srivastava et al. | 370/252 |
| 6,771,609 | B1 * | 8/2004 | Gudat et al. | 370/254 |
| 7,239,886 | B2 * | 7/2007 | Gross et al. | 455/522 |
| 7,817,996 | B2 * | 10/2010 | Brunner | 455/422.1 |
| 2002/0063656 | A1 * | 5/2002 | Gutowski | 342/360 |
| 2006/0072490 | A1 * | 4/2006 | McLaughlin et al. | 370/328 |
| 2007/0064643 | A1 * | 3/2007 | Tavares | 370/328 |
| 2008/0096566 | A1 * | 4/2008 | Brunner et al. | 455/437 |

OTHER PUBLICATIONS

Arjona, A. et al., "The Google Muni Wifi Network Can it Compete with Cellular Voice?" The Third Advanced international Conference on Telecommunications, May 2007, p. 1-6.
Bernardin, P. et al., "Cell Radius Inaccuracy: A New Measure of Coverage Reliability", IEEE Transactions on Vehicular Technology, Nov. 1998, p. 1-14.
Camp, J. et al., "Measurement Driven Deployment of a Two-Tier Urban Mesh Access Network", Proceedings of ACM MobiSys, Uppsala, Sweden, Jun. 2006, p. 96-109.
Cherry, S., "Wi-Fi nodes to talk amongst themselves", IEEE Spectrum Magazine, Jul. 2006, p. 55-56.
Erceg, V. et al., "An Empirically Based Path Loss Model for Wireless Channels in Suburban Environments", Proceedings of IEEE Globecom, Nov. 1998, p. 1205-1211.
Giannoulis, A. et al., "Supporting Vehicular Mobility in Urban Multihop Wireless Networks", Proceedings of ACM MobiSys, Breckenridge, CO, Jun. 2008, p. 1-13.
Goldsmith, A. J. et al., "A measurement-based model for predicting coverage areas of urban microcells", IEEE Journal on Selected Areas in Comm., Sep. 1993, p. 1013-1022.
Iskander, M. F. et al., "Propagation Prediction Models for Wireless Communication Systems", IEEE Transactions on Microwave Theory and Techniques, Mar. 2002, p. 662-673.

(Continued)

*Primary Examiner* — Mark Rinehart
*Assistant Examiner* — Mohammad Anwar

(57) ABSTRACT

A wireless network metric region in a wireless network is determined using a node metric region and a performance metric. The node metric region, which includes a boundary of the node metric region, for each node is estimated and the performance metric for the node metric region for each node is measured. The boundary of the node metric region for each node is adjusted based on the measured performance metric and then the wireless network metric region for the wireless network is determined based on the adjusted boundaries of the node metric region for each node.

20 Claims, 6 Drawing Sheets

(56) References Cited

OTHER PUBLICATIONS

Jin, X. et al., "Automated Building Extraction fromHigh-Resolution Satellite Imagery in Urban Areas Using Structural, Contextual, and Spectral Information", EURASIP 2005.

Kamenetsky, M. et al., "Coverage Planning for Outdoor Wireless LAN Systems", International Zurich Seminar on Broadband Communications, Feb. 2002, p. 1-6.

Kim, S. et al., "Radio propagation measurements and prediction usingthree-dimensional ray tracing in urban environments at 908 MHz and 1.9GHz", IEEE, May 1999, Abstract.

Kotz, D. et al., "Analysis of a Campuswide Wireless Network", MOBICOM'02, Sep. 2002, p. 1-12.

Kotz, D. et al., "Experimental Evaluation of Wireless Simulation Assumptions", MSWiM, ACM Oct. 2004, p. 1-5.

Lott, M. et al., "A Multi-Wall-and-Floor Model for Indoor Radio Propagation", Proceedings of IEEE Vehicular Technology Conference, 2001, p. 1-5.

Manoj, K. et al., "Coverage prediction for cellular networks from limited signalstrength measurements", IEEE, Sep. 1998, Abstract.

Pattuelli, R. et al., "Precision of the Estimation of Area Coverage by Planning Tools in Cellular Systems", IEEE Personal Communications, Jun. 2000, p. 1-4.

Rautiainen, T. et al., "Verifying path loss and delay spread predictions of a 3D ray tracing propagation model in urban environment", IEEE, 2002, Abstract.

Zvanovec, S. et al., "Wireless LAN Networks Design: Site Survey or Propagation Modeling?", Radio Engineering Prague, Dec. 2003, p. 42-49.

* cited by examiner

DETERMINING A METRIC REGION IN A WIRELESS NETWORK

RELATED APPLICATIONS

The present application is related to U.S. patent application Ser. No. 12/419,633, entitled "Location Determination for Placing a New Capacity Point in a Wireless Network", by Joshua P. Robinson, Mustafa Uysal, and Ram Swaminathan; and U.S. patent application Ser. No. 12/433,807, entitled "Selecting Wireless Mesh Node Locations", by Joshua P. Robinson, Mustafa Uysal, and Ram Swaminathan, all of which are incorporated by reference in their entireties.

BACKGROUND

In Wireless access networks, such as wireless mesh networks, Wireless Local Area Networks (WLAN), Worldwide Inter-operability for Microwave Access (WiMax) networks and wireless cellular networks, deployments of the networks are popular to provide broadband connectivity to large user populations. For instance, wireless mesh networks are being deployed in many cities in order to provide ubiquitous Internet access. Thus, wireless mesh networks provide citywide wireless coverage through the careful deployment of mesh nodes.

Evaluating performance of wireless access networks is useful for deploying and optimizing the networks. For example, evaluating performance may be useful for determining whether a wireless access network provides adequate service within a desired coverage area.

Even though wireless access networks are popular, no systematic studies have been conducted to assess a wireless access network's actual performance. Furthermore, evaluating a wireless access network's actual performance is difficult. For example, each node location has a different coverage area, varying with distance and terrain, which makes it difficult to estimate performance. In addition, exhaustive measurements to determine performance, such as performing measurements at every possible client location in a wireless access network, or using detailed computational ray-tracing approaches to determine performance can be expensive to obtain. Ray-tracing involves detailed propagation calculations, requiring highly detailed descriptions of the physical environment, including dimensions and makeup of all potential obstacles and scatterers. Thus, ray-tracing is not usually highly accurate because of the difficulty in obtaining the detailed descriptions of the environment.

BRIEF DESCRIPTION OF THE DRAWINGS

Features of the present invention will become apparent to those skilled in the art from the following description with reference to the figures, in which.

DETAILED DESCRIPTION

For simplicity and illustrative purposes, the present invention is described by referring mainly to exemplary embodiments. In the following description, numerous specific details are set forth to provide a thorough understanding of the embodiments. However, it will be apparent to one of ordinary skill in the art that the present invention may be practiced without limitation to these specific details. In other instances, well known methods and structures have not been described in detail to avoid unnecessarily obscuring the description of the embodiments.

Although a system including a wireless mesh network is described as an example of a system for any wireless network, it must be noted that the methods for determining a metric region, according to the embodiments of the present invention are not limited to be applied to the wireless mesh network. The methods can also be applied to any other wired or wireless networks, such as WLAN, WiMax, or wireless cellular networks as well.

Mesh networking includes a way to route data between nodes. A mesh node is an electronic device with a network interface that is capable of sending or receiving data via the network. Mesh networks allow for continuous connections and reconfiguration around broken or blocked paths by "hopping" from one node to another node until the destination is reached. When nodes are all connected to each other in a mesh network, it is a fully connected network. Mesh networks differ from other networks because the mesh nodes can all connect to each other via multiple hops, and they generally are not mobile. Clients in the mesh network may be mobile, such as mobile user devices including cell phones, laptops, etc. Mesh networks are self-healing in that the network can still operate even when a node breaks down or a connection goes bad. As a result, mesh networks are very reliable. A mesh network may include wired and wireless nodes. Thus, a mesh network may include both wireless network and wired network. However, in most instances, the majority of the nodes are wireless and may connect to a gateway node with a wired connection to a broadband network. Also, wireless mesh networks provide coverage in a target area, such as in a section of a city, in a building, etc.

Figure 1:
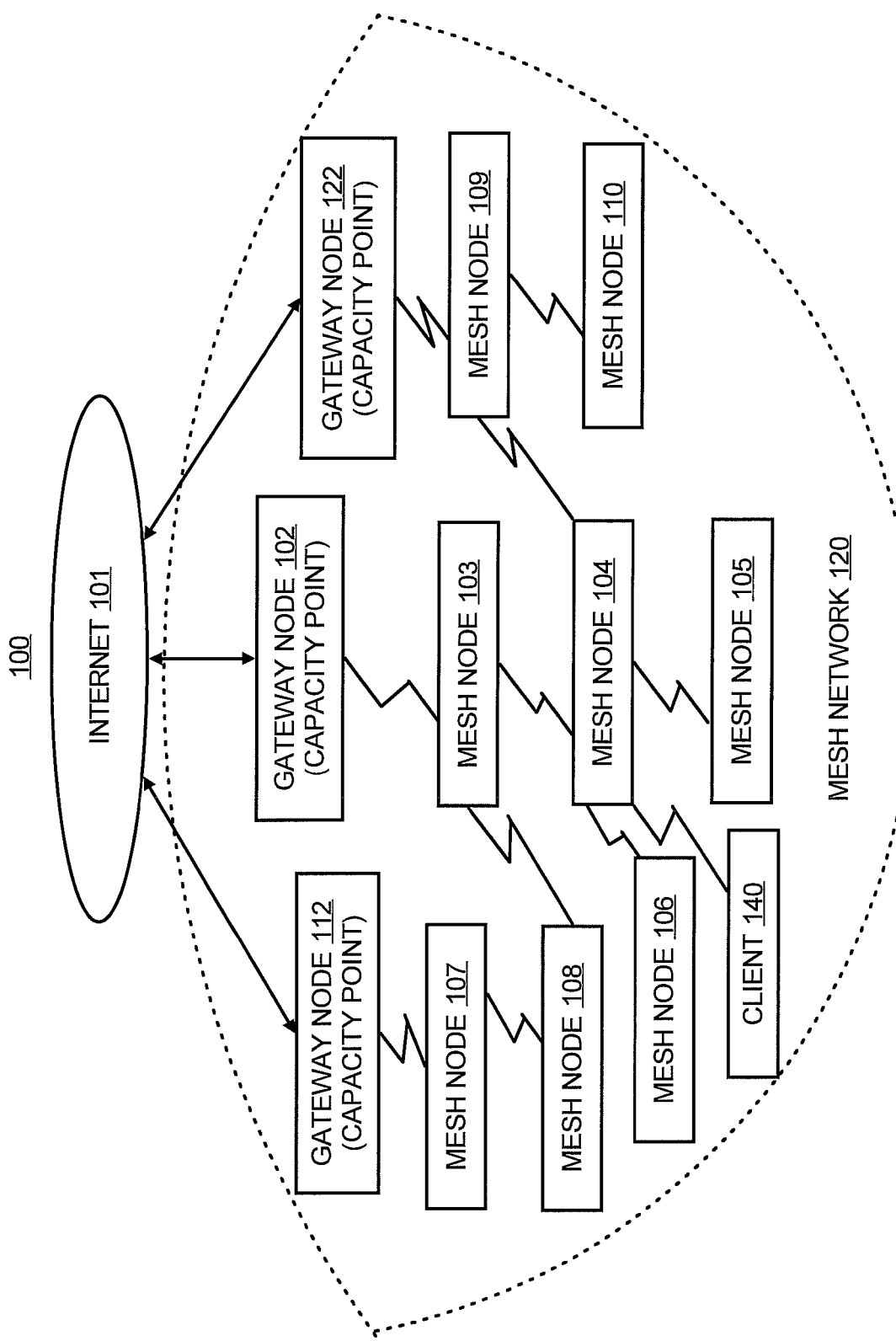
FIG. 1 shows a simplified block diagram of a system including a wireless mesh network, according to an embodiment of the present invention.

FIG. 1 illustrates a block diagram of a system 100 including a wireless mesh network 120, according to an embodiment of the present invention. The system 100 includes Internet 101 and the wireless mesh network 120. The wireless mesh network 120 may be connected to an access network or any wide area network (WAN) or other network, and not just the Internet.

The wireless mesh network 120 includes multiple nodes, shown as mesh nodes 103-110 and gateway nodes 102, 112, and 122. The gateway nodes 102, 112, and 122 are also referred to as capacity points because they provide the throughput or available bandwidth to the Internet. The gateway nodes 102, 112, and 122 are network nodes equipped for interfacing with another network outside the wireless mesh network 120 that may use different protocols. The wireless mesh network 120 also includes a client 130. In FIG. 1, the mesh nodes 103-110 are wirelessly connected to one or more other mesh node and to at least one gateway node directly or via multiple hops. The client 130 may be connected to the Internet 101 via the mesh nodes 110 and 109, and the gateway node 122, and the client 140 may be connected to the Internet 101 via the mesh nodes 106, 104 and 103, and the gateway node 102.

An embodiment of the present invention provides a method for determining a metric region using a small number of measurements in a wireless network, such as the mesh network 100 shown in FIG. 1 or WLAN. The metric region is a coverage area that is defined or based on a performance metric. Although each metric region would be defined or based on only one performance metric, multiple different performance metrics, such as signal strength or other performance metrics could be used for different metric regions.

In an embodiment of the present invention, a small number of actual measurements may be used to correct boundaries of estimated metric regions to improve accuracy of the evaluation for the wireless network. The "small number of measurements" may mean one percent or less of the number of exhaustive measurements, whereby the exhausted measurements are measurements at each potential client location within a wireless network. For instance, a small number of actual measurements could be around between twenty and thirty measurements per square kilometer of a wireless network. The terrain geometry combined with few carefully chosen measurements, according to an embodiment of the present invention, gives an accuracy that is very close to the one obtained through exhaustive measurements, yet requires far less number of measurements. The method of estimating performance metrics and determining metric regions, according to the embodiments of the present invention can be applied to any wired or wireless networks, such as WLAN or WiMax networks.

In an embodiment, a terrain T is defined as a continuous space of points, p∈T, on a 2-d Cartesian plane. Similarly, the set of nodes N is defined, where each node n∈N is defined by a coordinate pair in 2-d space. M represents a specific performance metric. In an embodiment, a Signal to Noise Ratio (SNR) based coverage metric is a performance metric, but modulation rate and redundancy are also two other types of performance metrics. For each point p, M(p) is defined as the measurable value of metric M at point p. Measurement cost is assumed to be identical for all points p∈T, but not for all metrics. In an embodiment of the present invention, the process begins by characterizing a single point with respect to a given metric M and given threshold, $\theta_M$, which represents the metric's performance cutoff.

For performance metric M, a node metric region is the set of all points p∈T. A wireless network metric region is the union of all node metric regions in set N. The node metric region is defined as a coverage area where performance metric M of a particular node can be measured. The role of measurements in a wireless network is to obtain additional knowledge with which to increase the accuracy of predicting the value of M at an unknown location. To limit the measurement expense of the assessment, a constraint that limits the total number of measurements is applied, according to an embodiment of the present invention. In an embodiment, it can be stated as an optimization problem and accordingly, maximizing the characterization accuracy over a terrain T subject to a constraint on the total number of measurements taken is achieved. In an embodiment, both the metric region of a single node (node metric region) and the metric region of an entire network (wireless network metric region) are considered.

In a coverage map, a node is a point in the terrain. The boundary of a metric sector of a node is the chain of connected line segments between a node on one supporting side of the sector and another node on the other supporting side of the sector. For a given metric, the disjoint union of all these sectors with their boundaries defines the metric region. This metric region would most likely differ from the simplified circular metric region that ignores the obstacles completely. For a given terrain and specified threshold, every metric defines a metric region around a node. The set of all locations in the terrain, each of which does not belong to the metric region of any node is a metric hole of the network.

In an embodiment of the present invention, the geometry of a terrain from given maps are constructed first, and then metric regions are estimated by sectoring the wireless network metric region and the boundaries of the sectors are determined using performance metrics. Finally, these boundaries are corrected using a small number of actual measurements.

Figure 2:
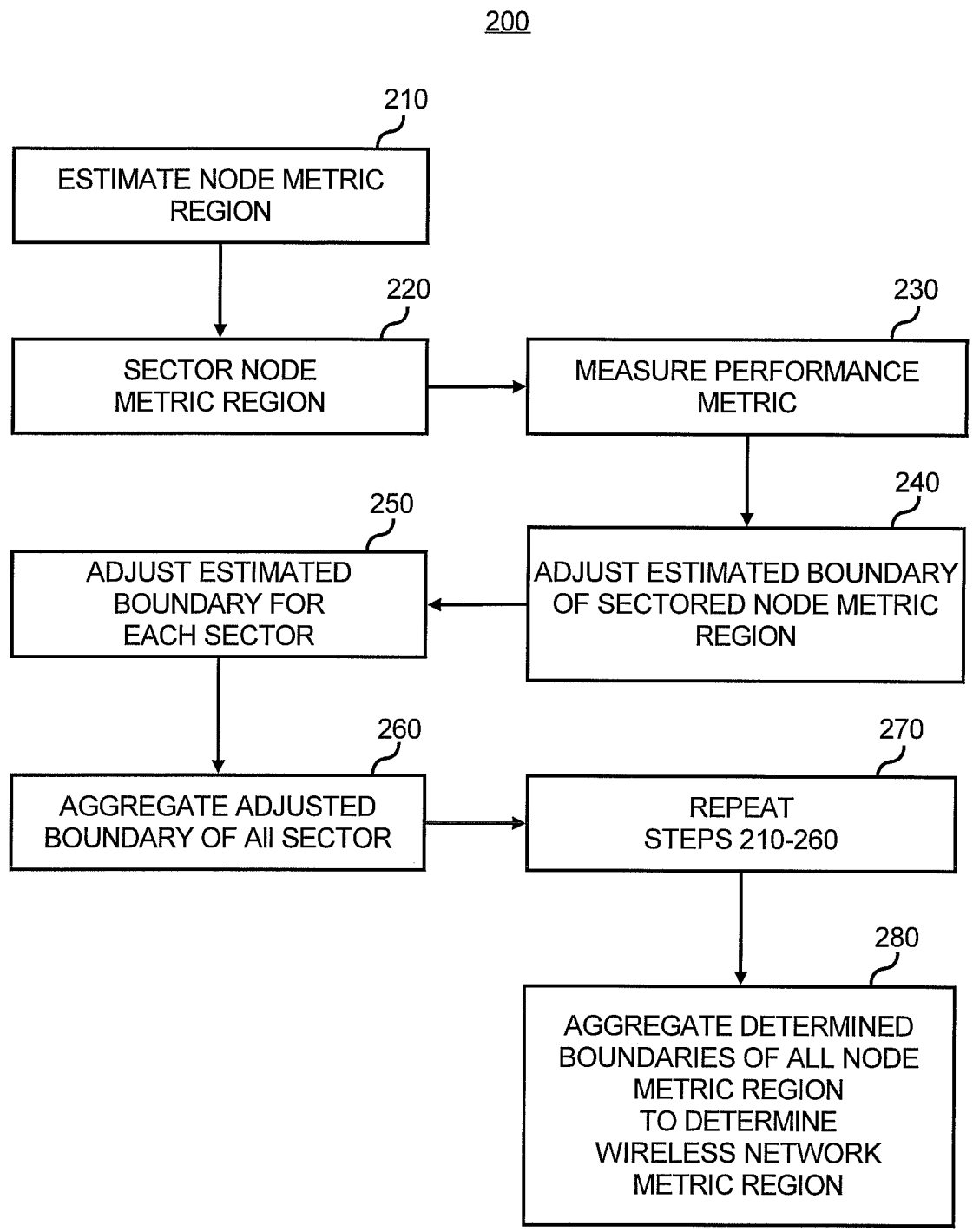
FIG. 2 illustrates a flowchart of a method for determining a wireless network metric region in a wireless network, according to an embodiment of the present invention.

FIG. 2 illustrates a flowchart of a method for determining a wireless network metric region in a wireless network, according to an embodiment of the present invention. At step 210, a node metric region for a node is estimated. At step 220, the estimated node metric region is sectored. Estimating and sectoring is performed using a performance metric. Also multiple performance metrics may be used for the estimating and sectoring. Also, the estimating and sectoring may be performed in a process described in further detail below.

The estimated node metric region includes an estimated boundary, and each sector includes a portion of the boundary. Examples of the estimated node metric regions, boundaries and sectors are shown in FIGS. 5A-F.

For each sector, steps 230 and 240 are performed (possibly iteratively) to adjust the estimated boundary to be a more accurate boundary representative of the actual performance metric and coverage area for the node.

At step 230, the performance metric used for the estimating and sectoring, such as an SNR based coverage metric, is measured at a location in or near the sector.

At step 240, the estimated boundary is adjusted based on the comparison. For example, the boundary is moved closer or farther from the node based on the comparison as described in further detail with respect to FIG. 4. Steps 230 and 240 may be repeated until the boundary is within a tolerance of the measured performance metric or the steps are performed a predetermined number of times.

The boundary is adjusted for each sector at step 250 using steps 230 and 240. At step 260, the adjusted boundaries for all the sectors are aggregated to determine the boundary for the node metric region. The aggregation includes connecting the boundaries to outline a coverage area for the node based on the performance metric.

At step 270, the steps 210-260 are repeated for each node in the wireless network to determine boundaries for a node metric region for each node.

At step 280, the determined boundaries are aggregated to determine a boundary for the wireless network metric region for the entire wireless network. The aggregation includes connecting the boundaries to outline a coverage area for the entire network based on the performance metric. Although many of the steps of the method 200 are described using a single performance metric, the steps may be performed using multiple performance metrics to establish boundaries and metric regions of the nodes and entire wireless network based on the multiple performance metrics.

In one embodiment, performance metrics include coverage, modulation rate, and redundancy. As described above, the coverage metric is based on the received SNR, labeled $P_{dB}(p, n)$, at a client location p from node n. A conformance threshold, $\theta_c$, indicates the minimum acceptable SNR. Consider a terrain T, a client location p, and a node n in T. The location p is covered by n if the received SNR at p with respect to n is, $P_{dB}(p, n) \geq \theta_c$. The coverage region of n is the set of all points p in T covered by n.

The second performance metric is modulation rate, which captures the expected value of the physical-layer modulation rate in use at a given location. This value is a function of SNR and the rate selection protocol is used. Let n be a node and p be a client location in a terrain T. The modulation rate of p with respect to n is the expected physical layer modulation rate in use. The modulation rate region of n is the set of all points in T with expected modulation rate at least threshold $\theta_r$.

The coverage redundancy metric is based directly on the coverage metric and is the number of nodes which cover a given point. The redundancy of a location p in a terrain T is the number of nodes that cover p. The k redundancy region of T is the set of all points in T with redundancy k or greater.

An embodiment of the present invention uses terrain information to divide the node metric region into virtual sectors of varying angular widths and radii. To accurately characterize the network's diverse propagation environment, sector angles and boundaries are independently estimated. More formally, a metric sector of node n is a sector of the circle centered at n contained between angles $\phi_1$ and $\phi_2$. In one embodiment, monotonic performance metrics are considered and it is defined as follows. Let the function d(p1; p2) denote the distance between points p1 and p2 in a terrain, then let T be a terrain and M be a metric. M is monotonic in T if for every node n in T, for any ray R emanating from n and for any two points p1 and p2 on R, if d(p1, n)<d(p2, n), then M(p1)≧M (p2).

While performance measures, such as signal strength decay are assumed monotonically for each ray, the use of multiple sectors with different radii does not require monotonicity among rays nor among sectors. For example, a far away signal strength can be greater than that of a closer distance provided that the two points are on rays having different angle from the originating node. It is assumed that this monotonicity property is satisfied for coverage and in fact, the coverage performance metric mostly satisfies this property. The modulation rate metric also satisfies monotonicity, whereas the redundancy metric does not.

For the purpose of the description, let the boundary of a metric sector be the arc segment between angles $\phi_1$ and $\phi_2$, which defines the sector's border at radial distance r from the node. With this definition, a monotonic metric at an unknown location is characterized based on whether it is inside the metric boundary or not. The disjoint union of all metric sectors and sector boundaries defines the metric region. The region boundary is non-uniform as it depends on the environment specifics in the region, and is different for each performance metric. In an embodiment, maximize accuracy of the estimated metric region means minimizing the difference between the estimated and true metric boundary of the metric region.

The framework provides three types of variables to optimize on a per-node basis: 1) the number of sectors, 2) each sector's boundaries, $\phi_1$ and $\phi_2$, and 3) the boundary distance r for each sector. The optimal solution may be achieved as the number of sectors goes to infinity, allowing the boundary to vary over smaller and smaller angles. In an embodiment, a small number of sectors are employed because there is significant correlation over moderate angular distances, and the grouped boundary allows refinement with few measurements per sector, increasing overall accuracy.

Below, estimation techniques are described for determining an estimated node metric region based on terrain information from digital maps. These estimation techniques may be performed for step 210 in FIG. 2 to estimate a node metric region.

A coverage estimator, which may be a software module, uses terrain information to improve accuracy. For coverage estimation, the environment has an average propagation environment (pathloss) throughout. Yet, specific areas exhibit different propagation behavior due to different terrain (e.g., streets vs. buildings). Thus, an antenna's transmission not only experiences different attenuation at each angle, but each ray also faces varying attenuation as it moves away from the source. To address this uncertainty, a method is to couple terrain maps with measurements to better estimate SNR at a point. It is done by calculating an average path loss for the entire network, and then for each measurement pair. The terrain information is used to estimate the shadowing, i.e., the deviation (in dB) from the average path loss.

Terrain features encompass any type of physical area of the input map, such as buildings, fields, or trees, all of which are approximated with polygons. The number of different feature types and resolution of the terrain features determines the amount of information gained from the map, and is dependent on how the map processing method groups similar features. Edge-detection image processing methods can be used to input satellite and city maps. The output of the map processing algorithm is the set of polygons representing the terrain features. Then use training measurements to assign attenuation weights, $C_f$, to each feature type to indicate the feature's impact on pathloss estimation. Coverage is estimated using the standard log-normal path loss equation with shadowing.

One of the key techniques is to use terrain features to estimate the shadowing value for each individual link. Thus, the terrain is considered when estimating the metric. Shadowing accounts for the random variations in signal strength between node and client pairs at the same distance d(n; p), which are due to differences in the scattering and attenuation environment and is usually represented as a zero-mean Gaussian random variable. Therefore, instead of estimating based only on average path loss, a terrain-informed shadowing estimator, $\beta(n, p)$, is also defined to capture the specific path's deviation (higher or lower) from the average path loss. Recall that the received power $P_{dB}$ is a function of the measured power, $P_0$, at reference distance $d_0$, and the average path loss exponent $\alpha$. The estimate for the SNR is then:

$$P_{dB}(p,n) = P_0 - 10\alpha \log(d(n,p)/d_0) + \beta(n,p) \tag{1}$$

The terrain-informed estimator, $\beta(n; p)$, depends on a) the terrain features in T that lie along the ray between the node n and point p, b) the width of this ray's intersection with each feature, and c) the feature type and weight, $C_f$. Specifically, $\beta(n, p)$ is defined as the sum of each intervening feature's impact on pathloss:

$$\beta(n, p) = \sum_{f \in F} C_f * w(n, p, f) \qquad (2)$$

where F is set of all features in the terrain T, $C_f$ is the weight of a feature (attenuation in dB per unit distance), and w(n, p, f) is the intersection width of the ray between n and p on the terrain feature f. In other words, each terrain feature that a link intersects either adds or subtracts from the value of the estimated pathloss, as a function of the feature weight $C_f$.

The α and $C_f$ terms above must be determined with some measurement overhead for each network. Training measurement locations are chosen randomly throughout the terrain, where each link intersects a subset of the terrain features in question. The training measurements must pass through a representative set of terrain features to capture each feature's effect on pathloss. In other words, take measurements driving around the edges of terrain features, as opposed to measurements within each feature. The measured SNR values and measurement distances, in combination with Equations (1) and (2), then lead to a system of equations with the parameters as unknowns. In one embodiment, minimum-mean squared error fitting is used to choose values of α and $C_f$, which best fit the measurements and equations. The number of measurements needed per feature type, found to be between 10 and 20 for high accuracy estimation according to an embodiment of the present invention. The approach for incorporating small-scale terrain features builds upon empirical models for outdoor path loss prediction in macro-cells with adjustments for terrain environments. The modulation rate estimator builds upon the coverage metric as follows. The constant $C_r$ maps SNR to an expected modulation rate choice, T(n,p), from the set of possible physical layer modulation rates as: T(n,p)= $C_r * P_{dB}(p,n)$, where $C_r$ is dependent on the interface technology in use. Estimation for redundancy metric derives directly from the coverage estimation discussed above.

Figure 3:
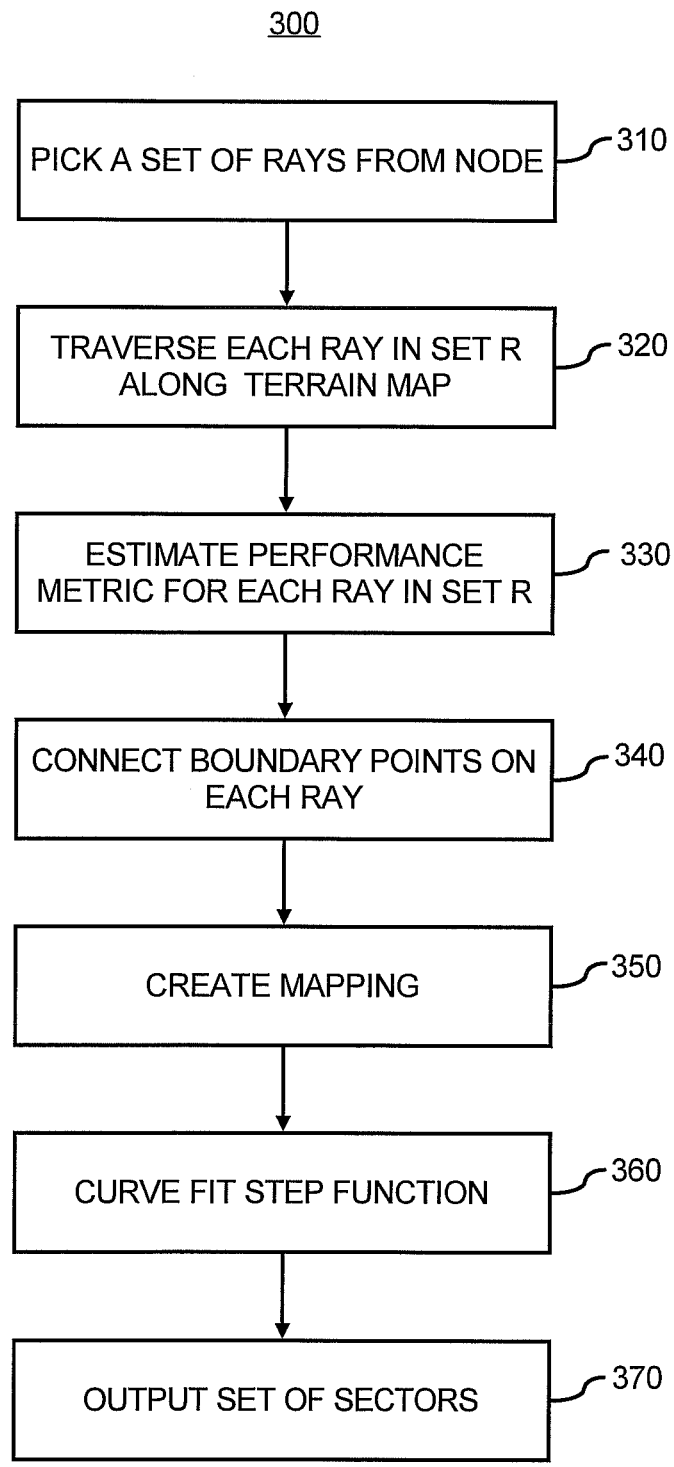
FIG. 3 illustrates a flowchart of a method for determining sectors and estimating a boundary of the node metric region for each sector, according to an embodiment of the present invention.

FIG. 3 illustrates a flowchart of a method for determining sectors and estimating a boundary of the node metric region for each sector, according to an embodiment of the present invention. Sector locations (e.g., angles $\phi_1$ and $\phi_2$ of rays extending from a node in a node metric region) and metric boundary distances of each sector are determined. The sector determination described below may be used for step 220 in FIG. 2. For the purpose of the description, the process illustrated in FIG. 3 is named "Estimate-Metric-Region" process. Terrain T, nodes N, and metric M are used in the process and the process is for every node n, when n∈N. Also, the steps in FIG. 3 are performed for each node.

At step 310, a set of rays at uniformly spaced angles from the node is picked. Call this set R, where the number of rays is chosen to be significantly larger than the desired number of final output sectors.

At step 320, for each ray in set R, the ray is traversed along the terrain map identifying terrain features and the respective type and attenuation.

At step 330, for each ray in set R, the value of the performance metric M is estimated to identify boundary points x on the ray, where $M(x) = \theta_M$.

At step 340, for each ray in set R, the boundary points x are connected on each ray to identify the estimated boundary of the sector.

At step 350, a mapping is created from each ray's angular position to the estimated metric boundary distance, d(n, x).

At step 360, a step function is curve fitted to the above mapping, minimizing the mean-squared error between the estimated boundary distance and step function approximation. Here, the number of steps corresponds to the number of allowed sectors, the height of each step is the boundary distance of each sector, and the cutoff points of each step are the sector border angles $\phi_1$ and $\phi_2$.

Finally, at step 370, a set of sectors is output with borders defined by step function cutoff points and the sector border angles $\phi_1$ and $\phi_2$.

Figure 4:
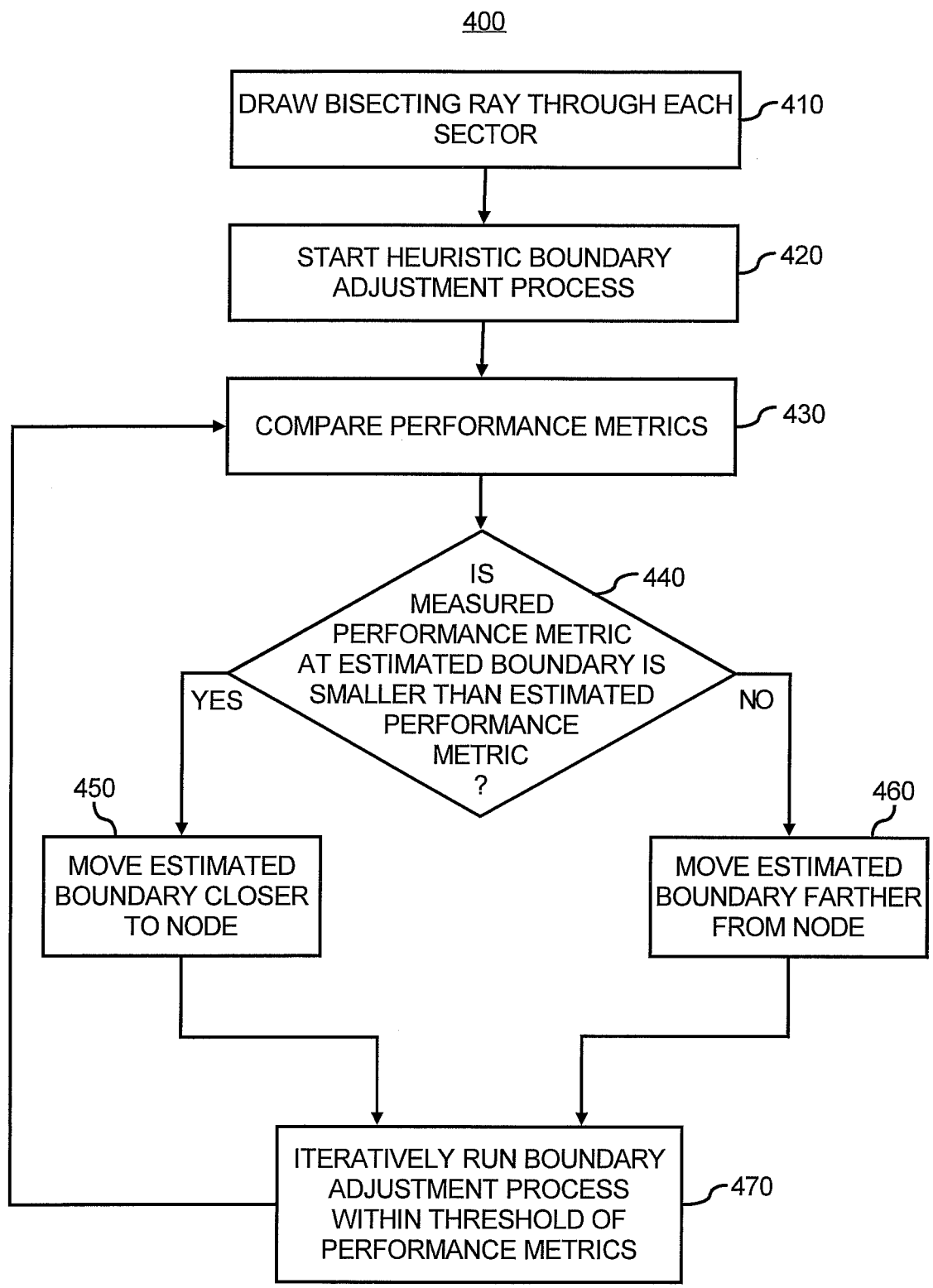
FIG. 4 illustrates a flowchart of a method for refining a boundary of a node metric region in a wireless network, according to an embodiment of the present invention.

FIG. 4 illustrates a flowchart of a method for refining a boundary of a node metric region in a wireless network, according to an embodiment of the present invention. The process to choose measurement locations in order to refine the boundary of each sector is a push/pull refinement heuristic process. Generally, the process measures at the estimated boundary and then either pulls or pushes the estimated boundary nearer or farther from the node based on the measurement result. The process terminates when a boundary is found (e.g., within a tolerance) or the number of measurements reaches a threshold. The steps of the method 400 may be performed for steps 230-250 in FIG. 2.

For the purpose of the description, the process illustrated in FIG. 4 is named "Refine-Estimate" process. Terrain T, wireless nodes N, sectors, and performance metric M are used in the process and the process is for each node n, when n∈N and for each sector of an estimated node metric region of a node n.

At step 410, a bisecting ray through each sector is drawn from the location of node n and boundary point x is identified, where the boundary intersects the ray.

At step 420, heuristic boundary refinement starts. At this step, while per-sector measurement budget not exceeded, a measurement of a performance metric as close as possible to the estimated boundary x is taken.

At step 430, the measurement of the performance metric at the estimated boundary x and an estimated performance metric determined from the estimated metric region are compared.

At step 440, if the measured performance metric at the estimated boundary x is smaller than the estimated performance metric (e.g., the performance metric, such as signal strength, was over-estimated), the process proceeds to step 450 and the estimated boundary x is moved closer to the node at step 450. If the measured performance metric at the estimated boundary x is larger than the estimated performance metric (e.g., the performance metric was under-estimated), the process proceeds to step 460 and the estimated boundary x is moved farther from the node at step 460. Here, these movements of the estimated boundary x can be done by a constant distance.

At step 470, the process goes back to the step 430 and the comparison of the performance metric using the moved estimated boundary x is performed iteratively. If the difference of the measurements of the performance metric using the moved estimated boundary x is within tolerance (e.g., ±3 dB) of threshold value, the heuristic boundary refinement process will be stopped. In an embodiment, instead of using a tolerance of a threshold value, the adjustment of the boundary of the node metric region process may be iteratively run for a predetermined number of times. Here, the resulting boundary point on the ray at the end of the boundary refinement process is labeled as z and arc is drawn through z to identify the refined boundary estimate for the metric sector. Finally, all the metric sectors are merged with adjusted boundaries to get the refined estimate of the metric region of the node. This process only needs a "small number of measurements" to accurately determine the boundary of the node metric region.

Figure 5A:
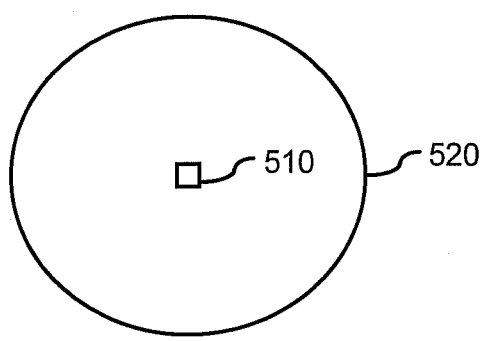
FIG. 5A shows a diagram of an estimated metric region, according to an embodiment of the present invention.
Figure 5D:
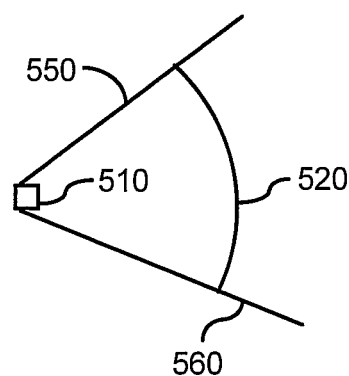
FIGS. 5D-F show diagrams of a sectored metric regions corresponding to FIGS. 5A-C, respectively, according to an embodiment of the present invention.
Figure 5B:
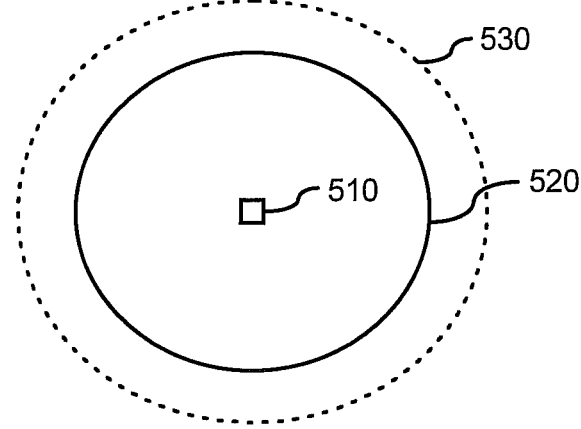
FIG. 5B shows a diagram of an adjustment of an under-estimated metric region, according to an embodiment of the present invention.
Figure 5E:
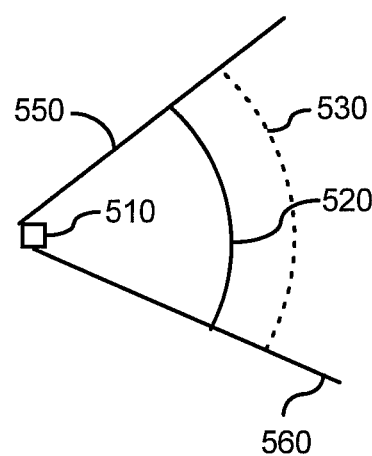
Figure 5C:
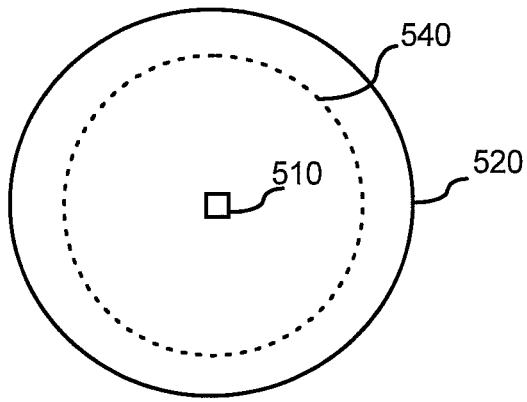
FIG. 5C shows a diagram of an adjustment of an over-estimated metric region, according to an embodiment of the present invention.

FIGS. 5A-C show diagrams of an estimated node metric region, an adjustment of an under-estimated metric region, and an adjustment of an over-estimated metric region, respectively, according to an embodiment of the present invention.

Although the metric regions illustrated in FIGS. 5A-C are shown as a circle, the actual shape of a node metric region may vary and may not having a smooth contour depends on many factors, such as a type of a node and characteristics of the performance metric used to estimate the node metric region.

An estimated metric region 520 for a node 510 is shown in FIGS. 5A-C. The node 510 is located inside (e.g., the center) of its estimated node metric region 520. The adjusted metric region 530 of the under-estimated metric region shown in FIG. 5B as dotted line has been moved farther from the node 510 because the measured performance metric (e.g., signal strength) at the estimated boundary of the estimated metric region 520 is larger than the estimated performance metric at the estimated metric region 520. The adjusted metric region 540 of the over-estimated metric region shown in FIG. 5C as dotted line has been moved closer to the node 510 because the measured performance metric at the estimated boundary of the estimated metric region 520 is smaller than the estimated performance metric at the estimated metric region 520.

Figure 5F:
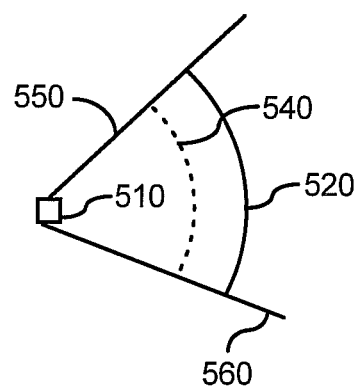

FIGS. 5D-F show diagrams of an estimated node metric region of a sector, an adjustment of a under-estimated node metric region of the sector, and an adjustment of a over-estimated node metric region of the sector, respectively, according to an embodiment of the present invention. FIGS. 5D-F show that a set of rays 550 and 560 are drawn at uniformly spaced angles from the node 510 to determine a node metric region. The plurality of sectored node metric region will be aggregated to determine the node metric region.

By limiting the number of measurements per sector in the Refine-Estimate process and by limiting the number of sectors in the Estimate-Metric-Region process, it is ensured that an upper bound on the total number of measurements taken, which is the product of the number of nodes, the number of sectors per node, and the maximum number of measurements per sector. There are two reasons for the actual number of measurements to be less than this bound: a) boundary refinement requires fewer measurements, and b) overlapping node metric regions allow a measurement to be taken for multiple nodes at one time.

Figure 6:
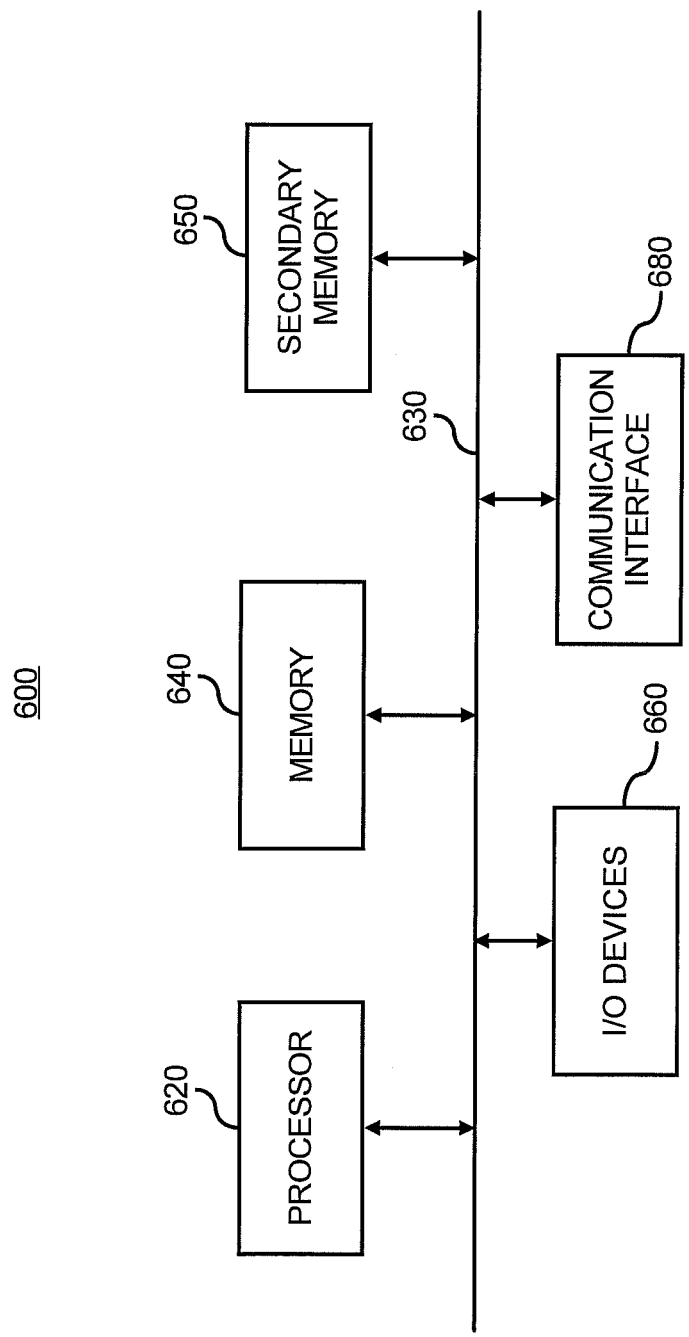
FIG. 6 shows a block diagram of a computer system that may be used as a platform for devices shown in FIG. 1, according to an embodiment of the present invention.

FIG. 6 shows the block diagram of a computer system 600 that may be used as a platform for a device configured to determine a metric region in a network to minimize a number of measurement for evaluating the network. The computer system 600 may also be used to execute one or more computer programs performing the methods, steps and functions described herein. The computer programs are stored in computer storage mediums.

The computer system 600 includes a processor 620, providing an execution platform for executing software. The processor 620 is configured to determine a wireless network metric region in a wireless network. The processor 620 is further configured to estimate the node metric region for each node, measure a performance metric for the node metric region for each node, adjust the boundary of the node metric region for each node based on the measured performance metric, and determine the node metric region for the wireless network based on the aggregated boundaries of the node metric regions. The processor 620 is also configured to aggregate the adjusted boundaries of the node metric region to determine the boundary of the wireless network metric region.

Commands and data from the processor 620 are communicated over a communication bus 630. The computer system 600 also includes a main memory 640, such as a Random Access Memory (RAM), where software may reside during runtime, and a secondary memory 650. The secondary memory 650 may include, for example, a nonvolatile memory where a copy of software is stored. In one example, the secondary memory 650 also includes ROM (read only memory), EPROM (erasable, programmable ROM), EEPROM (electrically erasable, programmable ROM), and other data storage devices, include hard disks. The main memory 640 as well as the secondary memory 650 may store a a small number of measurements of the performance metric and the node metric region for a node, the node locations, and the wireless network metric region as discussed before.

The computer system 600 includes I/O devices 660. The I/O devices 660 may include a display and/or user interfaces comprising one or more I/O devices, such as a keyboard, a mouse, a stylus, speaker, and the like. A communication interface 680 is provided for communicating with other components. The communication interface 680 may be a wireless interface. The communication interface 680 may be a network interface. The communication interface 680 is configured to sends and receives information used to sector the node metric region, to estimate the node metric region, to measure a performance metric, to adjust the boundary of the node metric region, and to determine the wireless network metric region.

Although described specifically throughout the entirety of the instant disclosure, representative embodiments of the present invention have utility over a wide range of applications, and the above discussion is not intended and should not be construed to be limiting, but is offered as an illustrative discussion of aspects of the invention.

What has been described and illustrated herein are embodiments of the invention along with some of their variations. The terms, descriptions and figures used herein are set forth by way of illustration only and are not meant as limitations. Those skilled in the art will recognize that many variations are possible within the spirit and scope of the invention, wherein the invention is intended to be defined by the following claims and their equivalents in which all terms are mean in their broadest reasonable sense unless otherwise indicated.

What is claimed is:

1. At least one non-transitory computer readable storage medium including instructions that when executed by a computer system performs a method for determining a wireless network metric region in a wireless network, the method comprising:

estimating a node metric region for each node, wherein each node metric region includes a boundary of the node metric region, and wherein estimating the node metric region includes:
calculating an average path loss for the wireless network and for a number of measurements included within a terrain map,
approximating terrain feature types within the terrain map based on the number of measurements, and
assigning attenuation weights to each of the terrain feature types to indicate a path loss estimation for each of the terrain feature types;

measuring a performance metric for the node metric region for each node;

adjusting the boundary of the node metric region for each node based on the measured performance metric; and determining the wireless network metric region for the wireless network based on the adjusted boundaries of the node metric regions.

2. The at least one computer readable storage medium of claim 1, wherein estimating the node metric region further comprises:
estimating the node metric region using the performance metric.

3. The at least one computer readable storage medium of claim 1, wherein estimating the node metric region further comprises:
estimating the node metric region using terrain information, wherein the terrain information includes at least one terrain feature that is determined from a map.

4. The at least one computer readable storage medium of claim 1, wherein the performance metric is a metric used to determine a coverage area for each node.

5. The at least one computer readable storage medium of claim 1, wherein estimating the node metric region further comprises:
estimating the boundary of the node metric region for each node.

6. The at least one computer readable storage medium of claim 5, wherein measuring the performance metric further comprises:
measuring the performance metric at the estimated boundary.

7. The at least one computer readable storage medium of claim 6, wherein the wireless network metric region for the wireless network includes a boundary in terms of the performance metric for an entire wireless network.

8. The at least one computer readable storage medium of claim 5, wherein adjusting the boundary of the node metric region for each node further comprises:
comparing the measured performance metric at the estimated boundary of the node metric region with an estimated performance metric determined from the estimated node metric region;
adjusting the estimated boundary to be closer to the node if the measured performance metric at the estimated boundary is smaller than the estimated performance metric; and
adjusting the estimated boundary to be farther from the node if the measured performance metric at the estimated boundary is larger than the estimated performance metric.

9. The at least one computer readable storage medium of claim 8, wherein adjusting the boundary of the node metric region further comprises:
adjusting the boundary of the node metric region for a predetermined number of times.

10. The at least one computer readable storage medium of claim 8, wherein determining the wireless network metric region is performed using a number of measurements.

11. The at least one computer readable storage medium of claim 5, wherein the method further comprises:
sectoring the node metric region, wherein each sectored node metric region includes a boundary of the each sectored node metric region and a node;
adjusting the estimated boundary of the each sectored node metric region to be closer to the node if the measured performance metric at the estimated boundary of the each sectored node metric region is smaller than the estimated performance metric of the each sectored node metric region;
adjusting the estimated boundary of the each sectored node metric region to be farther from the node if the measured performance metric at the estimated boundary of the each sectored node metric region is larger than the estimated performance metric of the each sectored node metric region; and
aggregating the adjusted boundary of the sectored node metric regions to determine the boundary of the node metric region and the wireless network metric region.

12. The at least one computer readable storage medium of claim 11, wherein sectoring the node metric region is performed based on types of the node.

13. At least one non-transitory computer readable storage medium including instructions that when executed by a computer system performs a method for determining a wireless network metric region in a wireless network, the method comprising:
estimating a node metric region for each node, wherein estimating the node metric region includes:
calculating an average path loss for the wireless network and for a number of measurements included within a terrain map,
approximating terrain feature types within the terrain map based on the number of measurements, and
assigning attenuation weights to each of the terrain feature types to indicate a path loss estimation for each of the terrain feature types;
sectoring the node metric region, wherein a sectored node metric region includes a boundary of the sectored node metric region and a node;
measuring a performance metric for the sectored node metric region for each node;
adjusting the boundary of the sectored node metric region for each node based on the measured performance metric;
aggregating the adjusted boundaries of the sectored node metric region to determine the boundary of the node metric region; and
determining the wireless network metric region for the wireless network based on the aggregated boundary of the sectored node metric regions.

14. The at least one computer readable storage medium of claim 13, wherein estimating the sectored node metric region further comprises:
estimating the sectored node metric region using the performance metric.

15. The at least one computer readable storage medium of claim 13, wherein estimating the sectored node metric region further comprises:
estimating the boundary of the sectored node metric region for each node.

16. The at least one computer readable storage medium of claim 15, wherein measuring the performance metric further comprises:
measuring the performance metric at the estimated boundary.

17. The at least one computer readable storage medium of claim 15, wherein adjusting the boundary of the sectored node metric region further comprises:
comparing the measured performance metric at the estimated boundary of the sectored node metric region with an estimated performance metric of the sectored node metric region determined from the estimated node metric region;
adjusting the estimated boundary of the each sectored node metric region to be closer to the node if the measured performance metric at the estimated boundary of the each sectored node metric region is smaller than the estimated performance metric of the each sectored node metric region; and adjusting the estimated boundary of the each sectored node metric region to be farther from the node if the measured performance metric at the estimated boundary of the each sectored node metric region is larger than the estimated performance metric of the each sectored node metric region.

18. A computer system configured to determine a node metric region in a wireless network, the computer system comprising:

a data storage storing a small number of measurements of a performance metric and the node metric region for a node, in the wireless network;

a processor configured to estimate the node metric region for the node, wherein to estimate the node metric region includes:

calculating an average path loss for the wireless network and for a number of measurements included within a terrain map, approximating terrain feature types within the terrain map based on the number of measurements, assigning attenuation weights to each of the terrain feature types to indicate a path loss estimation for each of the terrain feature types, adjusting boundaries of the node metric region by sector, and aggregating the adjusted boundaries and determine the node metric region, wherein the processor is further configured to measure the performance metric and the node metric region for each node, and determine the wireless network metric region for the wireless network; and an interface configured to communicate information used to estimate the node metric region, measure a performance metric, adjust the boundaries of the node metric region by sector, and determine the node metric region.

19. The computer system of claim 18, wherein the processor is further configured to compare the measured performance metric of the node metric region with an estimated performance metric of the node metric region determined from the estimated node metric region.

20. The computer system of claim 18, wherein the wireless network metric region for the wireless network includes a boundary in terms of the performance metric for an entire wireless network.

\* \* \* \* \*